United States Patent
Sasaki

(10) Patent No.: US 9,001,366 B2
(45) Date of Patent: Apr. 7, 2015

(54) CONTROL DEVICE

(71) Applicant: Brother Kogyo Kabushiki Kaisha, Nagoya (JP)

(72) Inventor: Hiroyuki Sasaki, Chita (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 98 days.

(21) Appl. No.: 13/846,725

(22) Filed: Mar. 18, 2013

(65) Prior Publication Data

US 2013/0326525 A1    Dec. 5, 2013

(30) Foreign Application Priority Data

May 31, 2012 (JP) ................................ 2012-124821

(51) Int. Cl.
     G06F 3/12    (2006.01)
     G06F 9/46    (2006.01)
     H04N 1/00    (2006.01)
     (Continued)

(52) U.S. Cl.
CPC ............ *G06F 9/46* (2013.01); *H04N 1/0023* (2013.01); *H04N 1/00244* (2013.01); *H04N 1/4413* (2013.01); *G06F 3/1213* (2013.01); *G06F 3/122* (2013.01); *G06F 3/1247* (2013.01); *G06F 3/1248* (2013.01); *G06F 3/1271* (2013.01); *G06F 3/1287* (2013.01); *H04N 2201/325* (2013.01); *H04N 2201/0027* (2013.01); *H04N 2201/0094* (2013.01)

(58) Field of Classification Search
CPC ............ H04N 1/0023; H04N 2201/0027; G06F 3/1213; G06F 3/1248; G06F 3/1271
See application file for complete search history.

(56) References Cited

U.S. PATENT DOCUMENTS

| 8,578,261 B1 | 11/2013 | Gupta et al. |
| 2002/0175841 A1 | 11/2002 | Koike |
| 2004/0172376 A1 | 9/2004 | Kobori et al. |

(Continued)

FOREIGN PATENT DOCUMENTS

| JP | 2002-073466 A | 3/2002 |
| JP | 2003-216390 A | 7/2003 |

(Continued)

OTHER PUBLICATIONS

Japan Patent Office, Office Action for Japanese Patent Application No. 2011-074582 (counterpart to above-captioned patent application), mailed Mar. 26, 2013.

(Continued)

*Primary Examiner* — Dov Popovici
(74) *Attorney, Agent, or Firm* — Merchant & Gould PC

(57) ABSTRACT

A control device for a function execution apparatus includes: a determination unit which, when a target function is selected from the plurality of functions, determines whether the function execution apparatus can execute the target function by using first data, based on the target function; and a processing execution unit which, when the function execution apparatus can execute the target function by using the first data, executes first processing for enabling the function execution apparatus to execute the target function by using the first data, and when the function execution apparatus is unable to execute the target function by using the first data, executes second processing for supplying second data to the function execution apparatus for enabling the function execution apparatus to execute the target function by using the second data converted from the first data.

8 Claims, 10 Drawing Sheets

(51) Int. Cl.
*H04N 1/44* (2006.01)
*G06K 15/00* (2006.01)

(56) References Cited

U.S. PATENT DOCUMENTS

| | | |
|---|---|---|
| 2006/0072721 A1 | 4/2006 | Wisniewski |
| 2006/0179413 A1 | 8/2006 | Eifler et al. |
| 2007/0112938 A1 | 5/2007 | Belimpasakis |
| 2007/0124781 A1 | 5/2007 | Casey et al. |
| 2007/0223051 A1 | 9/2007 | Henry et al. |
| 2008/0082677 A1 | 4/2008 | Miyazawa et al. |
| 2008/0137126 A1* | 6/2008 | Yoshida ............... 358/1.14 |
| 2008/0320173 A9 | 12/2008 | Matsushima et al. |
| 2009/0024626 A1 | 1/2009 | Takei |
| 2012/0081743 A1 | 4/2012 | Watanabe et al. |
| 2012/0084402 A1 | 4/2012 | Ito et al. |
| 2012/0254368 A1 | 10/2012 | Sasaki et al. |
| 2013/0202222 A1 | 8/2013 | Saito |
| 2013/0287371 A1 | 10/2013 | Choi et al. |

FOREIGN PATENT DOCUMENTS

| | | |
|---|---|---|
| JP | 2005-269250 A | 9/2005 |
| JP | 2006-260009 A | 9/2006 |
| JP | 2006-260335 A | 9/2006 |
| JP | 2012-209802 A | 10/2012 |

OTHER PUBLICATIONS

U.S. Patent and Trademark Office, Office Action for U.S. Appl. No. 13/363,294 (related to above-captioned patent application), mailed Jul. 12, 2013.

U.S. Office Action issued in related application U.S. Appl. No. 13/363,294, mailed Jan. 12, 2015.

* cited by examiner

FIG. 2

74: MODEL CORRESPONDENCE TABLE

| MODEL INFORMATION | DISPLAY | PRINTING | COLOR FAX | MONOCHROME FAX |
|---|---|---|---|---|
| MFP123 | jpeg | pwg-raster | jpeg | tiff |
| MFP456 | jpeg,PNG | pwg-raster, PDF | jpeg | tiff |

FIG. 3

76: URL INFORMATION TABLE

| ORIGINAL DATA FORMAT | CONVERTED DATA FORMAT | CONVERSION SERVER URL |
|---|---|---|
| PNG | jpeg | http://trans-ZZZ.com/png2jpeg |
| PNG | pwg-raster | http://trans-ZZZ.com/png2praster |
| PDF | tiff | http://trans-ZZZ.com/pdf2tiff |
| jpeg | pwg-raster | http://trans-ZZZ.com/jpeg2praster |

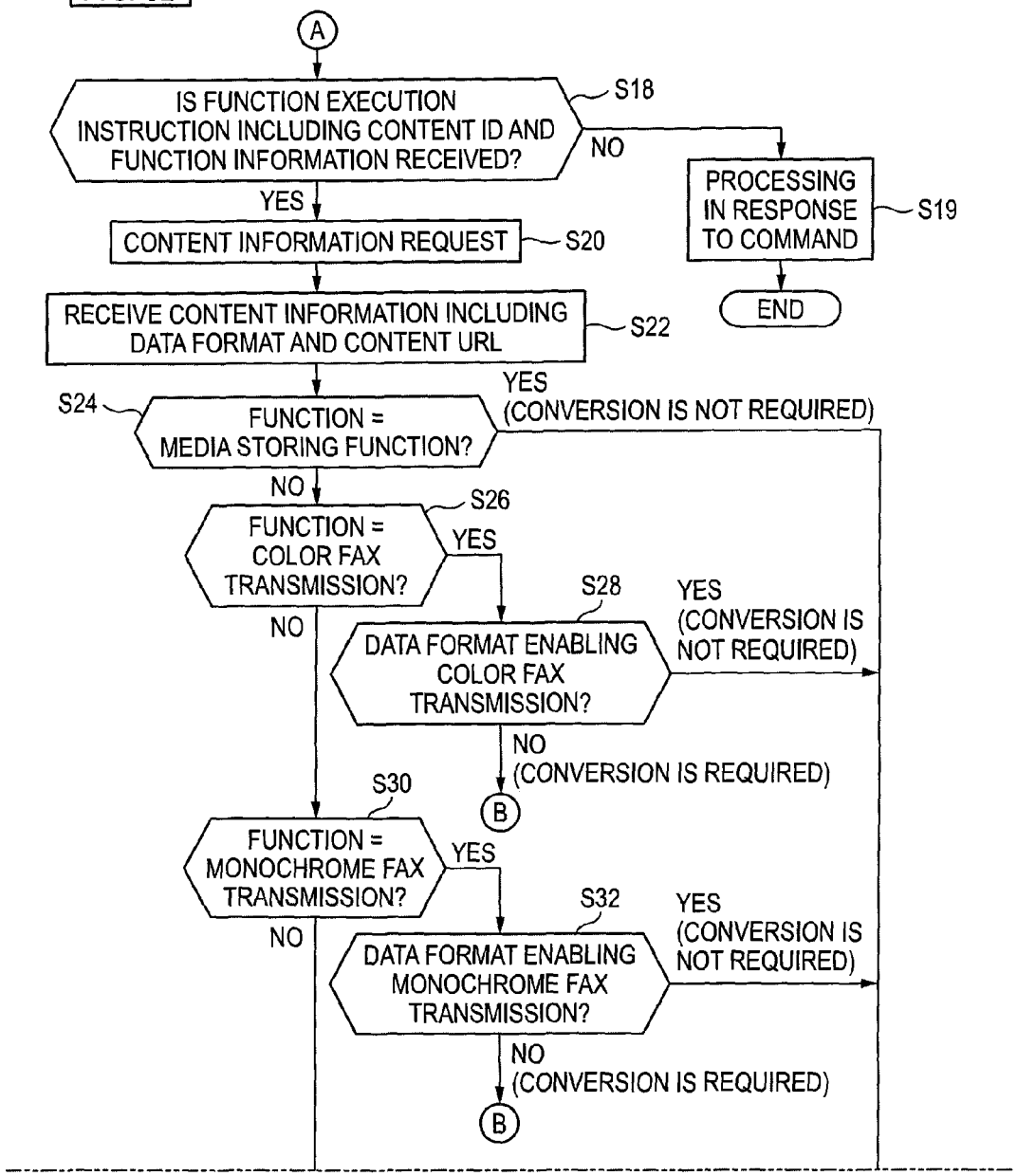

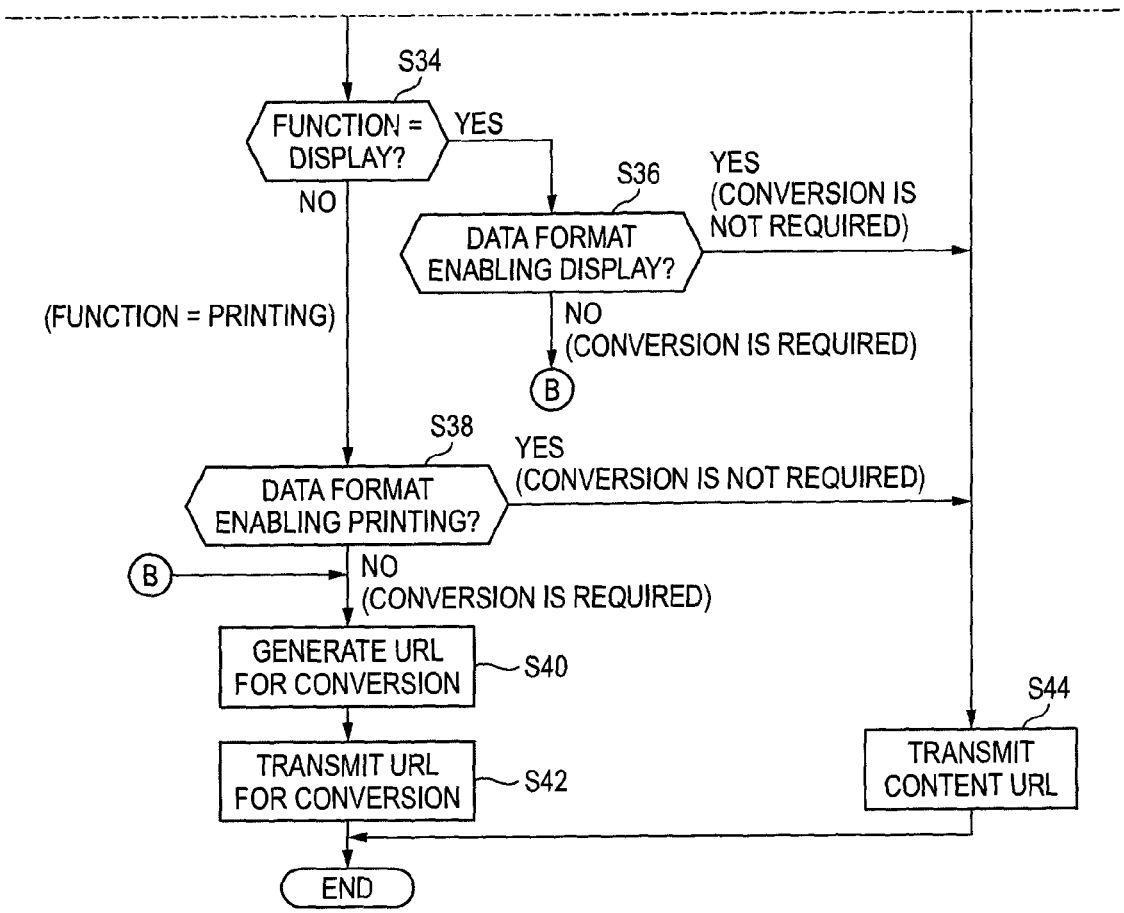

CONTROL DEVICE

CROSS-REFERENCE TO RELATED APPLICATIONS

This application claims priority from Japanese Patent Application No. 2012-124821 filed on May 31, 2012, the entire subject matter of which is incorporated herein by reference.

TECHNICAL FIELD

The invention relates to a control device for a function execution apparatus configured to execute a plurality of functions.

BACKGROUND

There have been disclosed an MFP that refers to an extension of a file name of a file attached to a received electronic mail and determines whether the attached file has a format that can be printed by the MFP. When the attached file does not have a format that can be printed by the MFP, the MFP requests a server to convert the attached file.

SUMMARY

Illustrative aspects of the invention provide a technology for enabling a function execution apparatus, which is configured to execute a plurality of functions, to appropriately execute its function by using data.

According to one illustrative aspect of the invention, there is provided a control device for a function execution apparatus configured to execute a plurality of functions. The control device comprises: a processor; and memory storing instructions that, when executed by the processor, causing the control device to operate as: a determination unit and a processing execution unit. The determination unit is configured to, when a target function is selected from the plurality of functions, determine whether the function execution apparatus is able to execute the target function by using first data, based on the target function. When it is determined that the function execution apparatus is able to execute the target function by using the first data, the processing execution unit is configured to execute first processing for supplying the first data to the function execution apparatus for enabling the function execution apparatus to execute the target function by using the first data. When it is determined that the function execution apparatus is unable to execute the target function by using the first data, the processing execution unit is configured to execute second processing, which is different from the first processing, for supplying second data to the function execution apparatus for enabling the function execution apparatus to execute the target function by using the second data that is converted from the first data.

BRIEF DESCRIPTION OF THE DRAWINGS

FIG. 2 shows an example of a model correspondence table;
FIG. 3 shows an example of a URL information table;
FIGS. 5A and 5B show flowcharts succeeding to FIG. 4.

DETAILED DESCRIPTION

<General Overview>

Figure 1:
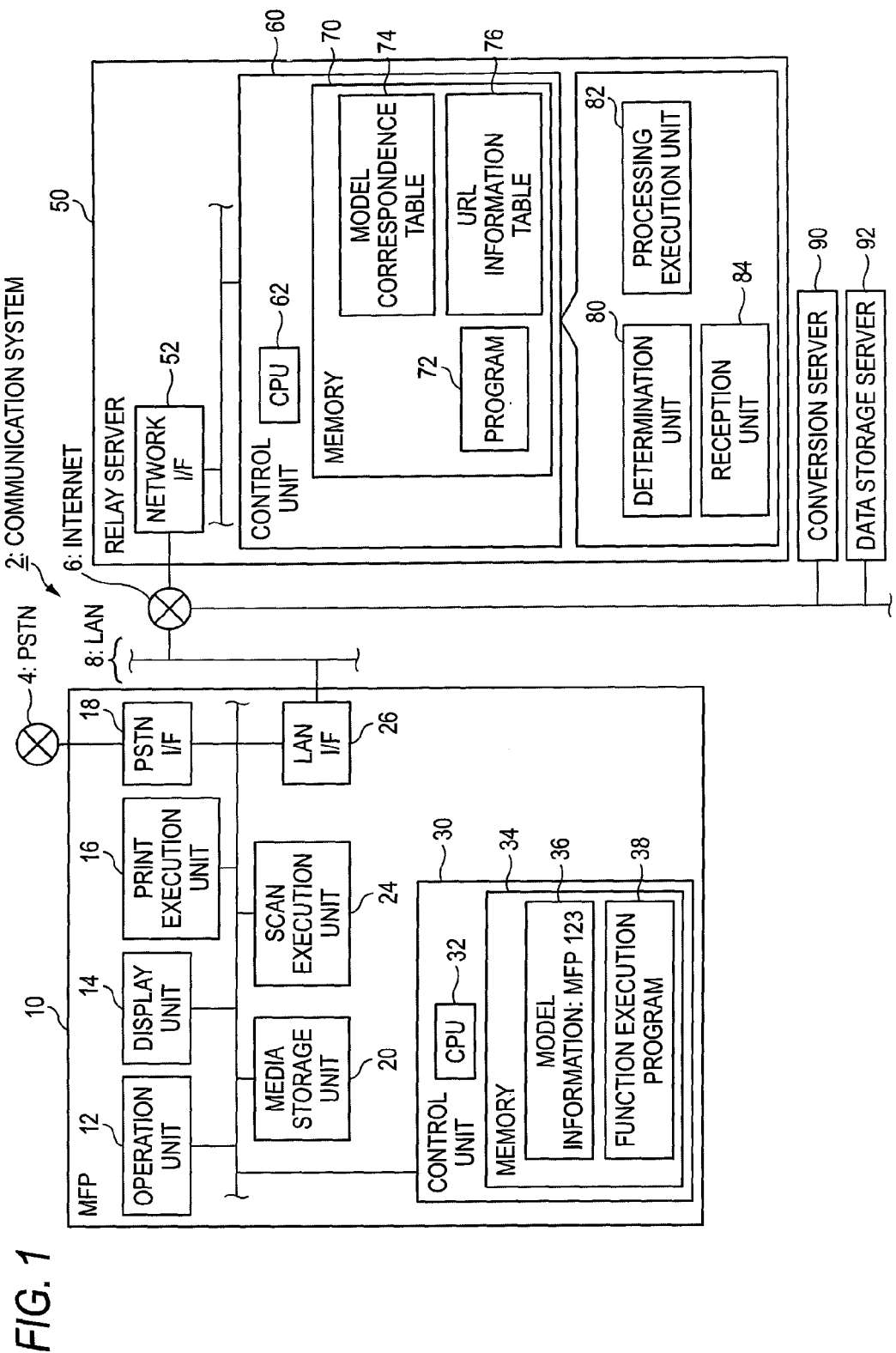
FIG. 1 shows a configuration of a communication system.

According to the above-described related-art technology, a situation where the MFP executes a function other than the printing by using the received attached file is not considered.

Therefore, illustrative aspects of the invention provide a technology for enabling a function execution apparatus, which is configured to execute a plurality of functions, to appropriately execute its function by using data.

According to a first illustrative aspect of the invention, there is provided a control device for a function execution apparatus configured to execute a plurality of functions. The control device comprises: a processor; and memory storing instructions that, when executed by the processor, causing the control device to operate as: a determination unit and a processing execution unit. The determination unit is configured to, when a target function is selected from the plurality of functions, determine whether the function execution apparatus is able to execute the target function by using first data, based on the target function. When it is determined that the function execution apparatus is able to execute the target function by using the first data, the processing execution unit is configured to execute first processing for supplying the first data to the function execution apparatus for enabling the function execution apparatus to execute the target function by using the first data. When it is determined that the function execution apparatus is unable to execute the target function by using the first data, the processing execution unit is configured to execute second processing, which is different from the first processing, for supplying second data to the function execution apparatus for enabling the function execution apparatus to execute the target function by using the second data that is converted from the first data.

In the above configuration, the control device determines whether the function execution apparatus is able to execute the target function by using the first data, based on the target function selected by the user from the plurality of functions, and executes the processing (e.g., the first processing, the second processing) depending on a result of the determination. As a result, the function execution apparatus can appropriately execute the target function selected by the user.

According to a second illustrative aspect of the invention, when the target function is a first function, the determination unit is configured to determine that the function execution apparatus is able to execute the target function by using the first data, irrespective of a data format of the first data. When the target function is a second function that is different from the first function, the determination unit is configured to determines whether the function execution apparatus is able to execute the target function by using the first data based on the data format of the first data in combination with the target function.

According to the above configuration, when the target function is the first function, the determination unit can appropriately determine that the function execution apparatus is able to execute the target function. Further, when the target function is the second function, the determination unit can appropriately determine whether the function execution apparatus is able to execute the target function, further based on the data format of the first data.

According to a third illustrative aspect of the invention, the instructions that, when executed by the processor, causes the control device to operate as a first storage unit configured to store format information relating to a data format with which the function execution apparatus is able to execute the function, for each of the plurality of functions. When the target function is the second function, the determination unit is configured to compare a data format, which is indicated by the format information of the second function in the first storage unit, and a data format of the first data so as to determine whether the function execution apparatus is able to execute the target function by using the first data.

According to the above configuration, when the target function is the second function, the determination unit can appropriately determine whether the function execution apparatus is able to execute the target function by using the first data.

According to a fourth illustrative aspect of the invention, the first function is a function that the function execution apparatus stores the first data in a storage medium set in the function execution apparatus.

In the above configuration, the function execution apparatus is able to execute the first function of storing the first data in the storage medium, irrespective of the data format of the first data.

According to a fifth illustrative aspect of the invention, the control device is configured to communicate with a data storage server, which stores the first data, through a network. The first processing comprises transmitting first location information, which indicates a location of the first data in the data storage server, to the function execution apparatus for enabling the function execution apparatus to acquire the first data from the data storage server.

According to the above configuration, since the function execution apparatus is able to acquire the first data from the data storage server by using the first location information, the function execution apparatus is able to execute the target function by using the first data.

According to a sixth illustrative aspect of the invention, the control device is independently configured from the function execution apparatus. The control device is configured to communicate with a data storage server, which stores the first data, through a network. The control device further comprises: a reception unit configured to receive first location information, which indicates a location of the first data in the data storage server, from the data storage server; and a second storage unit configured to store second location information, which indicates a location of a conversion device, the conversion device being configured to execute conversion processing of converting the first data to generate the second data. The second processing comprises transmitting the first location information and the second location information to the function execution apparatus such that the function execution apparatus enables the conversion device to execute the conversion processing.

According to the above configuration, since the function execution apparatus is able to acquire the second data from the conversion device, the function execution apparatus is able to execute the target function by using the second data.

According to a seventh illustrative aspect of the invention, the processing execution unit is configured to generate a third location information by combining the first location information and the second location information and to execute the second processing comprising transmitting the third location information to the function execution apparatus.

A control method and a computer program for implementing the above control device and a computer-readable storage medium storing therein the computer program are also novel and useful.

<Exemplary Embodiments>

Exemplary embodiments of the invention will now be described with reference to the drawings.

(Configuration of Communication System)

As shown in FIG. 1, a communication system 2 includes an MFP (Multi-Function Peripheral) 10, a relay server 50, a conversion server 90 and a data storage server 92. The MFP 10 is connected to a LAN 8. The respective servers 50, 90, 92 are connected to the Internet 6. Accordingly, the relay server 50 is connected in communication with the MFP 10 through the LAN 8 and the Internet 6. Further, the MFP 10 is connected to a PSTN (Public Switched Telephone Networks) 4. The MFP 10 is connected in FAX communication with an external apparatus through the PSTN 4. Incidentally, the number of the conversion server 90 and data storage server 92 included in the communication system 2 is not particularly limited. The communication system 2 may have a plurality of conversion servers and a plurality of data storage servers.

(Configuration of MFP 10)

The MFP 10 is configured to execute multi-functions such as printing function, display function, color FAX function, monochrome FAX function, data storing function to a medium and the like. The MFP 10 includes an operation unit 12, a display unit 14, a print execution unit 16, a PSTN interface 18, a media storage unit 20, a scan execution unit 24, a LAN interface 26 and a control unit 30. The operation unit 12 includes a plurality of keys. A user can input a variety of instructions into the MFP 10 by operating the operation unit 12. The display unit 14 is a display for displaying a variety of information. The print execution unit 16 includes a printing mechanism such as inkjet and laser ways. The media storage unit 20 includes a slot configured to receive a storage medium such as memory card, USB memory and the like. The scan execution unit 24 includes a scan mechanism such as CCD, CIS and the like. The PSTN interface 18 is an interface with which the MFP 10 performs communication through the PSTN 4. The LAN interface 26 is an interface with which the MFP 10 performs communication through the LAN 8.

The control unit 30 includes a CPU 32 and a memory 34. The CPU 32 executes a variety of processing in response to programs (for example, function execution program 38) stored in the memory 34. The CPU 32 executes the various processing in response to the function execution program 38, so that the printing function, display function, color FAX function, monochrome FAX function, data storing function to a medium, Internet connection function and the like are implemented.

The printing function is a function of printing an image, which is expressed by data of a print target, on a printing medium.

The display function is a function of displaying an image, which is expressed by data of a display target, on the display unit 14. The color FAX function is a function of communicating (transmitting or receiving) FAX data, which expresses a color image, through the PSTN 4. The monochrome FAX function is a function of communicating (transmitting or receiving) FAX data, which expresses a monochrome image, through the PSTN 4. Incidentally, in the below, the function of transmitting the FAX data is referred to as 'FAX transmission function' and the function of receiving the FAX data is referred to as 'FAX reception function.' The data storing function to a medium is a function of storing data into a storage medium set in the media storage unit 20. The Internet connection function is a function of acquiring data from an external apparatus (for example, data storage server 92) or transmitting data to the external apparatus through the Internet 6.

The memory 34 further stores model information 36 (e.g., 'MFP 123') of the MFP 10. The memory 34 beforehand stores the model information 36 at the time of shipment of the MFP 10. The model information 36 is information for specifying a model of the MFP 10. The model information 36 is not inherent to the MFP 10 only. That is, the same model information 36 is provided to the same model as the MFP 10.

(Configuration of Relay Server 50)

The relay server 50 is a server that is separately configured from the MFP 10 and the servers 90, 92. The relay server 50 is a server for relaying provision of data from the data storage server 92 to the MFP 10. The relay server 50 is a server that is provided by a vendor of the MFP 10.

The relay server 50 includes a network interface 52 and a control unit 60. The network interface 52 is an interface with which the relay server 50 performs communication through the Internet 6. The control unit 60 includes a CPU 62 and a memory 70. The memory 70 includes a ROM, a RAM and the like. The CPU 62 executes a variety of processing in response to a program 72 stored in the memory 70. The CPU 62 executes the various processing in response to the program 72, so that functions of respective units 80 to 84 are implemented. The memory 70 further stores a model correspondence table 74 and a URL information table 76.

(Configuration of Model Correspondence Table 74)

As shown in FIG. 2, model information (for example, MFP 123, MFP 456 and the like) of a communication device (for example, MFP 10 and the like) and a plurality of format information (for example, jpeg, tiff and the like) corresponding to a plurality of functions, which can be executed by the communication device, are stored in association with each other in a model correspondence table 74. Each format information indicates a data format that the communication device is able to execute a function corresponding thereto. For example, the MFP (for example, MFP 10) that is a model specified by the model information 'MFP 123' is able to execute the display function by using the data format 'jpeg' (which is an abbreviation of 'Joint Photographic Experts Group') and the printing function by using data having the data format 'pwg (which is an abbreviation of 'Printer Working Group')-raster.' Incidentally, 'tiff' is an abbreviation of Tagged Image File Format, 'PNG' is an abbreviation of 'Portable Network Graphics' and 'PDF' is an abbreviation of Portable Document Format. The model information table 74 is stored in the memory 70 by the vendor of the MFP 10. The vendor of the MFP 10 updates the model correspondence table 74 when the vendor manufactures an MFP of a new model.

(Configuration of URL Information Table 76)

As shown in FIG. 3, an original data format, a converted data format and a conversion server URL are stored in association with each other in a URL information table 76. The original data format indicates a data format of data before conversion. The converted data format indicates a data format of data after conversion. The conversion server URL is a URL of a conversion server that is able to execute conversion processing of converting data before conversion having the original data format into converted data having the converted data format. For example, a URL of a conversion server that is able to convert data having a data format 'PNG' into data having a data format 'jpeg' is 'http://trans-ZZZ.com/png2jpeg' that is associated with the original data format 'PNG' and the converted data format 'jpeg.'

(Configuration of Conversion Server 90)

The conversion server 90 is allotted with a URL 'http://trans-ZZZ.com' indicating a location on the Internet 6. The conversion server 90 is a server for converting a data format of data that is received from the external apparatus. For example, the conversion server 90 converts data having a data format that is unable to be interpreted by the MFP 10 into data having a format that can be interpreted by the MFP 10. The conversion server 90 is a server that is provided by the vendor of the MFP 10. On the other hand, the conversion server 90 may not be a server that is provided by the vendor of the MFP 10.

(Configuration of Data Storage Server 92)

The data storage server 92 is a server for storing data, which is acquired from the communication device (for example, MFP 10, PC and the like), and providing the stored data to the communication device. The data storage server 92 is not a server that is provided by the vendor of the MFP 10. On the other hand, the data storage server 92 may be a server that is provided by the vendor of the MFP 10. The data storage server 92 may be a well-known server such as 'Evernote (registered trademark)', 'Google (registered trademark) Docs', 'Picasa (registered trademark)' and 'facebook (registered trademark)', for example. Incidentally, the data storage server 92 is allotted with a URL 'http://abc.com' indicating a location on the Internet 6.

When a user of the MFP 10 wants to upload or download a data file to or from the data storage server 92 by using the MFP 10, the user inputs a user ID and a password, which are registered in the data storage server 92, into the MFP 10. When the data storage server 92 receives the user ID and password from the MFP 10, the data storage server 92 executes authentication processing. When the authentication is successful, the data storage server 92 permits the upload or download of the data file from the MFP 10 to the data storage server 92.

For example, the user of the MFP 10 can upload one or more data files to the data storage server 92 by using the MFP 10. Further, the user of the MFP 10 can download the uploaded data file from the data storage server 92 by using the MFP 10. The data storage server 92 generates a content ID, which is identification information of the uploaded data file, and a content URL, which indicates a location of the corresponding data file in the data storage server 92. Further, the data storage server 92 generates thumbnail data and a thumbnail URL, which indicates a location of the thumbnail data in the data storage server 92 by using the original data included in the uploaded data file. The thumbnail data is data expressing a thumbnail image having a size smaller than an original image expressed by the original data. The data storage server 92 stores a user ID, a content ID, a content URL, a data file, thumbnail data and a thumbnail URL in association with each other.

(Conversion Determining Processing that is Executed by Relay Server 50)

Subsequently, conversion determining processing that is executed by the control unit 60 of the relay server 50 is described with reference to FIGS. 4 and 5. The control unit 60 monitors whether a command is received from the communication device (for example, MFP 10). When it is detected that a command is received from the communication device (for example, MFP 10), the control unit 60 starts processing of FIG. 4. In S2, the control unit 60 determines whether the command received from the communication device (for example, MFP 10) is a thumbnail request.

For example, the user of the MFP 10 operates the operation unit 12 to thus select a data storage server. Subsequently, the user of the MFP 10 selects the display function for displaying a thumbnail image from the plurality of functions that is to be executed by the MFP 10. When the display function for displaying a thumbnail image is selected, the MFP 10 displays an input screen of a user ID and a password on the display unit 14. The user can input a user ID and a password by operating the operation unit 12. When a user ID and a password are input, the MFP 10 transmits the input user ID and password to the data storage server 92. When the user ID and the password are received from the MFP 10, the data storage server 92 executes authentication processing and transmits an authentication result to the MFP 10. When the received authentication result indicates that the authentication is successful, the MFP 10 transmits a thumbnail request to the relay server 50. Incidentally, in the below, the user ID (e.g., the user ID of the user of the MFP 10) that is used for the authentication processing is referred to as 'target user ID.'

When the thumbnail request is not received (NO in S2), the control unit 60 proceeds to S18 of FIG. 5. On the other hand, when the thumbnail request is received (YES in S2), the control unit 60 transmits a thumbnail information list request to the data storage server 92 (S4). The thumbnail request includes the model information (for example, 'MFP 123') of the communication device (for example, the MFP 10). In the below, the descriptions are continued while exemplifying a case where the thumbnail request is received from the MFP 10.

When the thumbnail information list request is received, the data storage server 92 transmits the thumbnail information list to the relay server 50. The thumbnail information list includes a plurality of thumbnail information. Each thumbnail information includes a content ID, which is associated with the target user ID, a thumbnail URL, which is associated with the content ID, and a data format of thumbnail data, which is associated with the content ID.

In S6, a reception unit 84 receives the thumbnail information list from the data storage server 92. Then, in S8, a determination unit 80 determines whether the MFP 10 is able to execute the display function of a thumbnail image. Specifically, the determination unit 80 specifies a format information (e.g., 'beg') corresponding to the display function, which is recorded in the model correspondence table 74 (refer to FIG. 2) in association with the model information (e.g., 'MFP 123') received in S2. Then, the determination unit 80 selects one thumbnail information from one or more thumbnail information included in the thumbnail information list. The determination unit 80 determines whether a data format included in the selected thumbnail information is jpeg' or not. When a data format included in the selected thumbnail information is jpeg' (YES in S8), the control unit 60 proceeds to S14. On the other hand, when a data format included in the selected thumbnail information is not 'jpeg' (NO in S8), the control unit 60 proceeds to S10.

In S10, a processing execution unit 82 generates a URL for conversion. The URL for conversion is a URL for enabling the conversion server 90 to convert the data format of the thumbnail data, which is specified by the thumbnail URL included in the selected thumbnail information, into the data format 'jpeg' of the format information specified in S8. Specifically, the processing execution unit 82 first specifies a conversion server URL from the URL information table 76 (refer to FIG. 3). The specified conversion server URL is a URL (for example, http://trans-ZZZ.com/png2jpeg) that is associated with the original data format, which indicates the data format included in the selected thumbnail information, and the converted data format indicating the data format 'jpeg' specified from the model information table 74 in S8.

Then, the processing execution unit 82 generates a URL for conversion (for example, http://trans-ZZZ.com/png2jpeg?src=http://abc.com/datalthumb.png) by using the specified conversion server URL (for example, http://trans-ZZZ.com/png2jpeg) and a thumbnail URL (for example, http://abc.com/datalthumb.png) included in the selected thumbnail information. That is, the processing execution unit 82 generates the URL for conversion by combining the conversion server URL and the thumbnail URL.

Then, in S12, the processing execution unit 82 replaces the thumbnail URL included in the selected thumbnail information with the URL for conversion generated in S10. In S14, the processing execution unit 82 determines whether the processing of S8 to S12 has been executed for all the thumbnail information included in the thumbnail information list received in S6. When the thumbnail information for which the processing of S8 to S12 has not been executed is included in the thumbnail information list (NO in S14), the control unit 60 returns to S8 and one thumbnail information that has not been selected is selected.

On the other hand, when the processing of S8 to S12 has been executed for all the thumbnail information (YES in S14), the processing execution unit 82 transmits a URL list in which the respective URLs (which may include the URL for conversion and the thumbnail URL) and the respective content IDs are associated with each other to the MFP 10 that is a transmission source of the thumbnail request of S2 and ends the processing.

When the URL list is received from the relay server 50, the MFP 10 designates each URL included in the URL list as a transmission destination and transmits the thumbnail request. When the URL designated as the transmission destination is a thumbnail URL, the thumbnail request is transmitted to the data storage server 92. In this case, the data storage server 92 transmits the thumbnail data corresponding to the thumbnail URL to the MFP 10. On the other hand, when the URL designated as the transmission destination is a URL for conversion, the thumbnail request is transmitted to the conversion server 90. In this case, the conversion server 90 designates the thumbnail URL designated using the URL for conversion as the transmission destination and transmits the thumbnail request to the data storage server 92. Then, the conversion server 90 receives the thumbnail data corresponding to the thumbnail URL from the data storage server 92. Then, the conversion server 90 converts a format of the thumbnail data. The conversion server 90 transmits the converted data to the MFP 10. When the thumbnail data or converted data is received, the MFP 10 displays an image, which is expressed by the thumbnail data or converted data, on the display unit 12. The display unit 12 displays one or more thumbnail images, which are expressed by one or more thumbnail data or converted data, on one screen.

In S18, the control unit 60 determines whether the command received from the communication device (for example, the MFP 10) is a function execution instruction including a content ID and function information. For example, the user of the MFP 10 operates the operation unit 12 to thus select one thumbnail image from one or more thumbnail images displayed on the display unit 14. Further, the user of the MFP 10 operates the operation unit 12 to thereby select one function from the printing, color FAX transmission, monochrome FAX transmission, media storing and display functions (in the below, the function selected by the user is referred to as 'target function'). In this case, the MFP 10 transmits a function execution instruction including the content ID, which corresponds to the thumbnail data of the thumbnail image selected by the user, and the function information indicating a type of the target function. In the below, the descriptions are continued while exemplifying a case where the function execution instruction is received from the MFP 10.

When the received command is not a function execution instruction (NO in S18), the control unit 60 executes processing (for example, update of the model correspondence table 74) in response to the command received in S18 and ends the processing. On the other hand, when the received command is a function execution instruction (YES in S18), the control unit 60 transmits a content information request to the data storage server 92 (S20). The content information request includes the content ID (hereinafter, referred to as 'target content ID') included in the function execution instruction.

When the content information request is received from the relay server 50, the data storage server 92 specifies a data format of the data file that is associated with the target content ID included in the content information request. Then, the data storage server 92 transmits content information including the specified data format and the content URL associated with the target content ID to the relay server 50.

In S22, the reception unit 84 receives the content information transmitted from the data storage server 92. Then, in S24, the determination unit 80 determines whether a type of the target function is the media storing function. When the target function is the media storing function (YES in S24), the control unit 60 proceeds to S44.

When a type of the target function is not the media storing function (NO in S24), the determination unit 80 determines whether a type of the target function is the color FAX transmission function (S26). When a type of the target function is the color FAX transmission function (YES in S26), the determination unit 80 determines whether the MFP 10 is able to execute the color FAX transmission function by using the data file that is stored in the data storage server 92 in association with the target content ID (S28). Specifically, the determination unit 80 first specifies format information (e.g., jpeg') corresponding to the color FAX associated with the model information (e.g., 'MFP 123') received in S2 from the model correspondence table 74 (refer to FIG. 2). Then, the determination unit 80 determines whether the data format received in S22 coincides with the data format jpeg' indicated by the specified format information. When they coincide (YES in S28), the control unit 60 proceeds to S44. Otherwise, the control unit 60 proceeds to S40.

On the other hand, when a type of the target function is not the color FAX transmission function (NO in S26), the determination unit 80 determines whether a type of the target function is the monochrome FAX transmission function (S30). When the target function is the monochrome FAX transmission function (YES in S30), the determination unit 80 determines whether the MFP 10 is able to execute the monochrome FAX transmission function by using the data file that is stored in the data storage server 92 in association with the target content ID (S32). Specifically, the determination unit 80 first specifies format information (e.g., 'tiff') corresponding to the monochrome FAX associated with the model information (e.g., 'MFP 123') received in S2 from the model correspondence table 74 (refer to FIG. 2). Then, the determination unit 80 determines whether the data format received in S22 coincides with the data format 'tiff' indicated by the specified format information. When they coincide (YES in S32), the control unit 60 proceeds to S44. Otherwise, the control unit 60 proceeds to S40.

On the other hand, when a type of the target function is not the monochrome FAX transmission function (NO in S30), the determination unit 80 determines whether a type of the target function is the display function (S34). When a type of the target function is the display function (YES in S34), the determination unit 80 determines whether the MFP 10 is able to execute the display function by using the data file that is stored in the data storage server 92 in association with the target content ID (S36). Specifically, the determination unit 80 first specifies format information (e.g., jpeg') corresponding to the display associated with the model information (e.g., 'MFP 123') received in S2 from the model correspondence table 74 (refer to FIG. 2). Then, the determination unit 80 determines whether the data format received in S22 coincides with the data format jpeg' indicated by the specified format information. When they coincide (YES in S32), the control unit 60 proceeds to S44. Otherwise, the control unit 60 proceeds to S40.

On the other hand, when a type of the target function is not the display function (NO in S34), the type of the target function is the printing function. In this case, in S38, the determination unit 80 determines whether the MFP 10 is able to execute the printing function by using the data file that is stored in the data storage server 92 in association with the target content ID. Specifically, the determination unit 80 first specifies format information (e.g., 'pwg-raster') corresponding to the printing associated with the model information (e.g., 'MFP 123') received in S2 from the model correspondence table 74 (refer to FIG. 2). Then, the determination unit 80 determines whether the data format received in S22 coincides with the data format 'pwg-raster' indicated by the specified format information. When they coincide (YES in S32), the control unit 60 proceeds to S44. Otherwise, the control unit 60 proceeds to S40.

In S40, the processing execution unit 82 generates a URL for conversion. Specifically, the processing execution unit 82 first specifies a conversion server URL from the URL information table 76 (refer to FIG. 3). The specified conversion server URL is a URL (for example, http://trans-ZZZ.com/png2jpeg) that is associated with the original data format, which indicates the data format included in the content information received in S22, and the converted data format indicating the data format specified from the model correspondence table 74 in any one of S28, S32, S36 and S38. Then, the processing execution unit 82 generates a URL for conversion (for example, http://trans-ZZZ.com/png2jpeg?src=http://ab-c.com/data1.png) by using the specified conversion server URL and the content URL (for example, http://abc.com/data1.png) included in the content information received in S22. That is, the processing execution unit 82 generates the URL for conversion by combining the conversion server URL and the content URL.

In S42, the processing execution unit 82 transmits the URL for conversion generated in S40 to the communication device (for example, the MFP 10) that is a transmission source of the function execution instruction and ends the processing. Incidentally, in S44, the processing execution unit 82 transmits the content URL to the MFP 10 that is a transmission source of the function execution instruction and ends the processing. That is, when a type of the target function is the media storing function (YES in S24), the determination unit 80 determines that the MFP 10 is able to execute the media storing function by using the data file, irrespective of the data format of the data file. On the other hand, when a type of the target function is a function other than the media storing function (YES in S26, S30 or S34), the determination unit 80 determines whether the MFP 10 is able to execute the target function by using the data file, based on the data format of the data file in addition to the type of the target function (S28, S32, S36 and S38). When it is determined that the MFP 10 is able to execute the target function by using the data file (YES in S24, S28, S32, S36 or S38), the processing execution unit 82 executes the processing of S44. On the other hand, when it is determined that the MFP 10 is unable to execute the target function by using the data file (NO in S28, S32, S36 or S38), the processing execution unit 82 executes the processing of S40 and S42'.

When the content URL or URL for conversion is received from the relay server 50, the MFP 10 designates the received URL as a transmission destination and transmits a data request. When the URL designated as a transmission destination is the content URL, the data request is transmitted to the data storage server 92. In this case, the data storage server 92 transmits the data file corresponding to the content URL to the MFP 10. On the other hand, when the URL designated as a transmission destination is the URL for conversion, the data request is transmitted to the conversion server 90. In this case, the conversion server 90 designates the content URL specified using the URL for conversion as a transmission destination and transmits the data request to the data storage server 92. Then, the conversion server 90 receives the data file associated with the content URL from the data storage server 92. Then, the conversion server 90 converts the format of the data file. The conversion server 90 transmits the converted data file to the MFP 10. When the data file is received, the MFP 10 executes the target function by using the data file.

(Cases where Functions to be Executed by MFP 10 are Different)

In the below, the processing of the respective apparatuses 10, 50, 90, 92 are described in four cases where the functions that the MFP 10 is to execute are different with reference to FIGS. 6 to 9.

Figures 6, 6A, 6B:
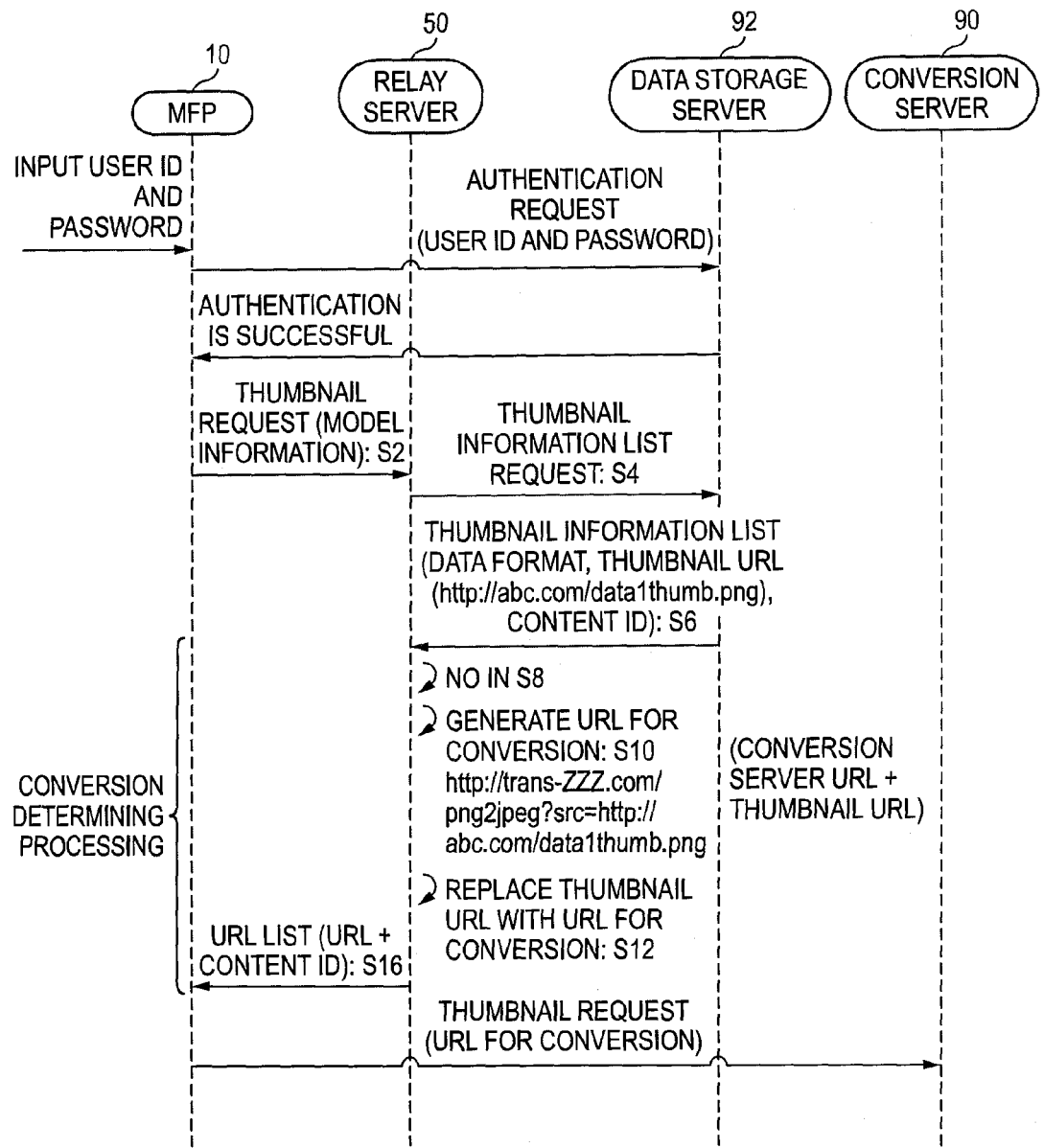
FIGS. 6A and 6B show sequence diagrams of a first case where a target function is a thumbnail display and data conversion is required.
Figure 6B:
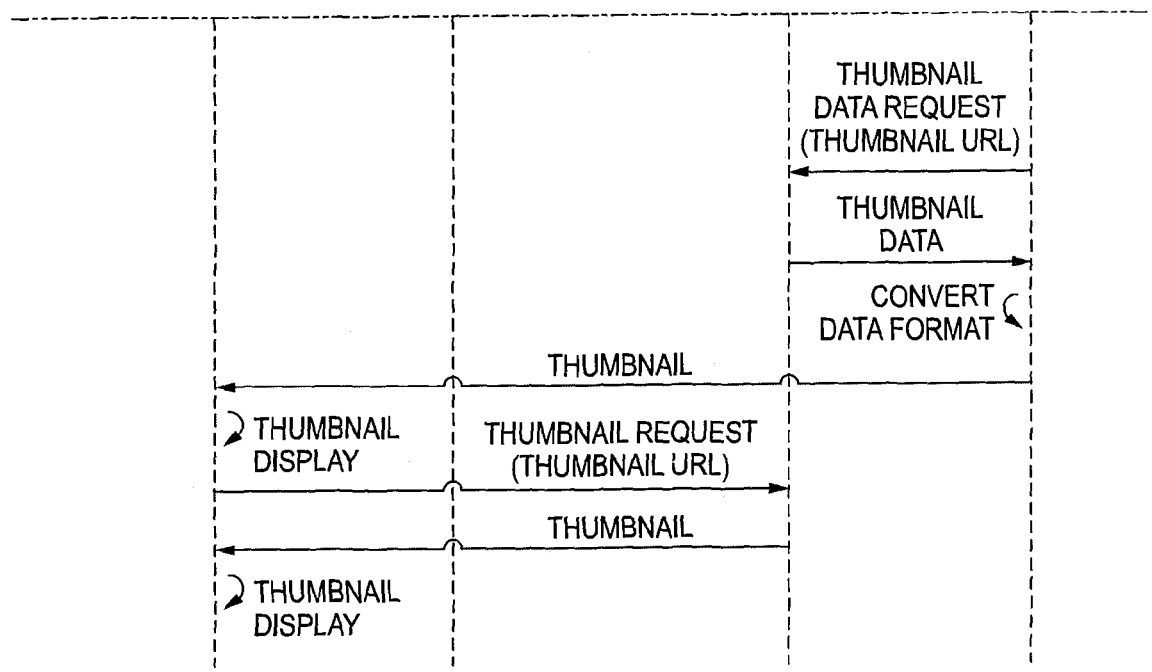

(First Case: FIG. 6)

A first case is a case where the target function is the display function for displaying a thumbnail image. The user of the MFP 10 operates the operation unit 12 to thus input the user ID and password, which are beforehand registered in the data storage server 92, into the MFP 10. The MFP 10 transmits the input user ID and password to the data storage server 92.

When the user ID and password are received, the data storage server 92 executes the authentication processing and transmits an authentication result, which indicates that the authentication is successful, to the MFP 10. Thereby, the data storage server 92 is able to provide the data file, which is beforehand uploaded by the user of the MFP 10, as requested.

When the authentication result indicating that the authentication is successful is received, the MFP 10 transmits a thumbnail request to the relay server 50. Incidentally, the thumbnail request includes the model information of the MFP 10. When the thumbnail request is received (YES in S2 of FIG. 4), the relay server 50 transmits a thumbnail information list request to the data storage server 92 (S4 in FIG. 4). When the thumbnail information list request is received, the data storage server 92 transmits a thumbnail information list to the relay server 50.

Figure 4:
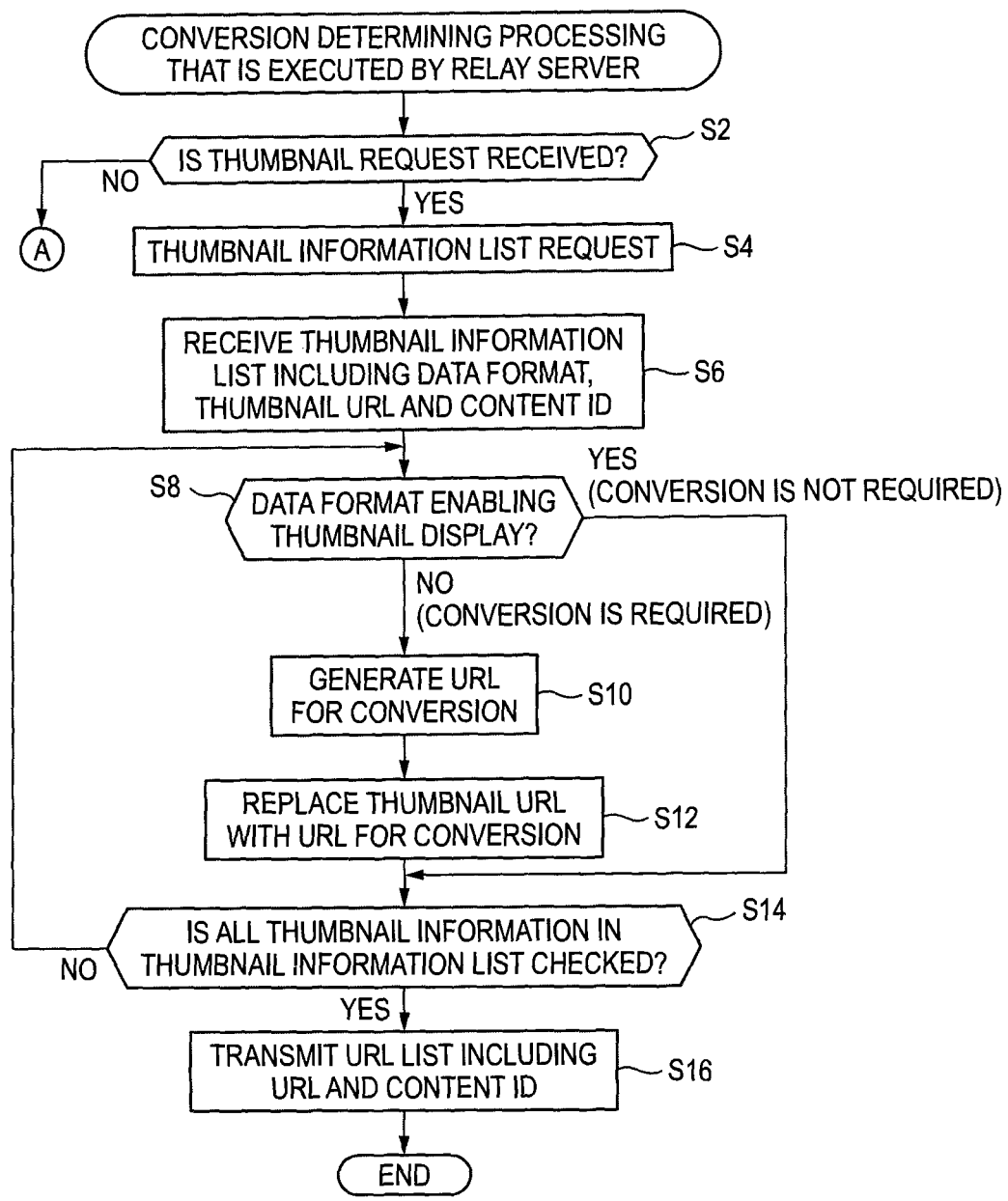
FIG. 4 shows a flowchart of conversion determining processing that is executed by a relay server.

When the thumbnail information list is received (S6 in FIG. 4), the relay server 50 determines whether each data format of one or more thumbnail information included in the thumbnail information list coincides with the data format (e.g., jpeg) that the MFP 10 is able to display (S8 in FIG. 4). In the first case, it is determined that the data format included in at least one thumbnail information does not coincide with the data format that the MFP 10 is able to display (NO in S8 of FIG. 4).

The relay server 50 generates a URL for conversion by using the thumbnail URL of the thumbnail information including the data format for which NO is determined in S8 of FIG. 4 and the URL information table 76 (S10 in FIG. 4). Then, the relay server 50 replaces the thumbnail URL of the thumbnail information with the URL for conversion (S12 in FIG. 4). When the processing of S8 to S12 of FIG. 4 is executed for all the thumbnail information included in the thumbnail information list, the relay server 50 transmits a URL list including URLs and content IDs to the MFP 10 (S16 in FIG. 4).

When the URL list is received from the relay server 50, the MFP 10 designates each URL included in the URL list as a transmission destination and transmits the thumbnail request. When the URL for conversion (for example, http://trans-ZZZ.com/png2jpeg?src=http://abc.com/datalthumb.png) is designated as a transmission destination, the thumbnail request is transmitted to the conversion server 90. When the thumbnail request is received, the conversion server 90 acquires the thumbnail data from the data storage server 92 by using the URL for conversion. Specifically, the conversion server 90 interprets a character string (for example, http://abc.com/dataltthumb.png), which is described at a position after 'src=' of the URL for conversion, as a thumbnail URL, designates the thumbnail URL as a transmission destination and transmits a thumbnail data request to the data storage server 92.

When the thumbnail data request is received, the data storage server 92 transmits the thumbnail data, which is associated with the thumbnail URL included in the thumbnail data request, to the conversion server 90.

When the thumbnail data is received from the data storage server 92, the conversion server 90 executes the format conversion of converting the data format (for example, from data of the PNG format into data of the jpeg format), based on the character string (for example, 'png2jpeg') described at a predetermined position of the URL for conversion (for example, http://trans-ZZZ.com/png2jpeg?src=http://abc.com/datalthumb.png). Then, the conversion server 90 transmits the converted thumbnail data to the MFP 10. When the thumbnail data is received, the MFP 10 displays a thumbnail image, which is expressed by the thumbnail data, on the display unit 14.

According to the above configuration, the MFP 10 enables the conversion server 90 to execute the format conversion of converting the data format of the thumbnail data by using the URL for conversion.

As a result, the MFP 10 is able to acquire the converted thumbnail data. Therefore, the MFP 10 is able to execute the display function of the thumbnail image by using the converted thumbnail data.

On the other hand, when the thumbnail URL (for example, http://abc.com/data2thumb.png) is designated as a transmission destination, the thumbnail request is transmitted to the data storage server 92. When the thumbnail request is received, the data storage server 92 transmits the thumbnail data corresponding to the thumbnail URL included in the thumbnail request to the MFP 10. When the thumbnail data is received, the MFP 10 displays a thumbnail image, which is expressed by the thumbnail data, on the display unit 14.

According to the above configuration, the MFP 10 is able to acquire the thumbnail data from the data storage server 92 by using the thumbnail URL. Therefore, the MFP 10 is able to execute the display function of the thumbnail image by using the thumbnail data.

The MFP 10 executes the transmission of the thumbnail request, the reception of the thumbnail data and the display of the thumbnail image for each of one or more URLs included in the URL list.

Thereby, one or more thumbnail images are displayed on the display unit 14.

Figure 7:
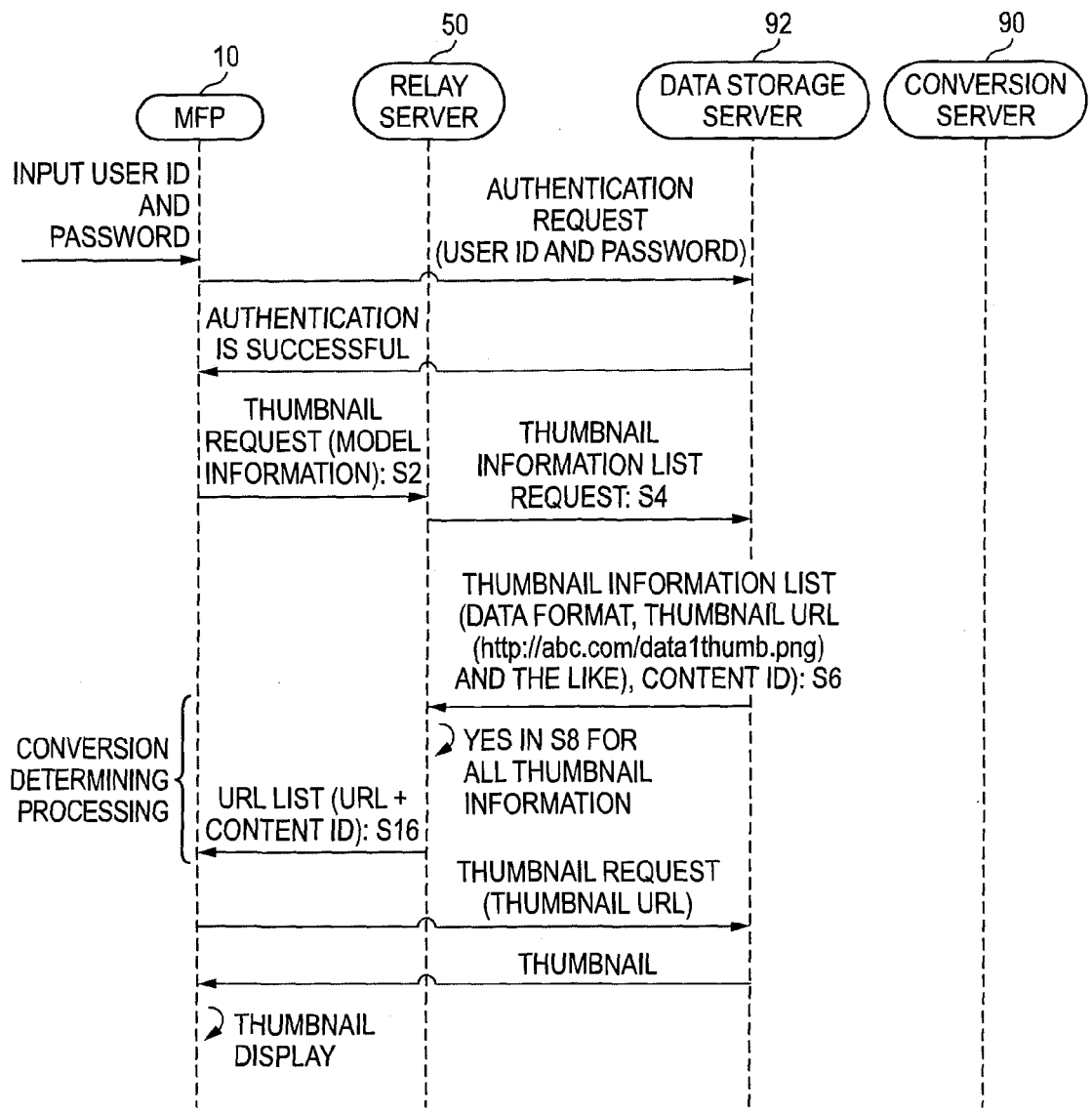
FIG. 7 shows a sequence diagram of a second case where a target function is a thumbnail display and data conversion is not required.

(Second Case: FIG. 7)

In a second case, the target function is the display function for displaying a thumbnail image, like the first case. In the second case, the processing is the same as that of the first case until the processing of S6 of FIG. 4 is executed. However, in the second case, it is determined that all the data formats included in the thumbnail information list coincide with the data format that the MFP 10 is able to display (YES in S8 of FIG. 4). In this case, the relay server 50 skips over the processing of S10 and S12 of FIG. 4 and transmits the URL list including the thumbnail URLs of the thumbnail information list and the content IDs to the MFP 10 (S16 in FIG. 4).

When the URL list is received, the MFP designates each URL included in the URL list as a transmission destination and transmits a thumbnail request. One or more thumbnail requests are transmitted to the data storage server 92. Whenever the thumbnail data is received from the data storage server 92, the MFP 10 displays a thumbnail image, which is expressed by the thumbnail data, on the display unit 14. Thereby, one or more thumbnail images are displayed on the display unit 14.

According to the above configuration, the MFP 10 is able to acquire the thumbnail data from the data storage server 92 by using the thumbnail URL. Therefore, the MFP 10 is able to execute the display function of the thumbnail image by using the thumbnail data.

Figure 8:
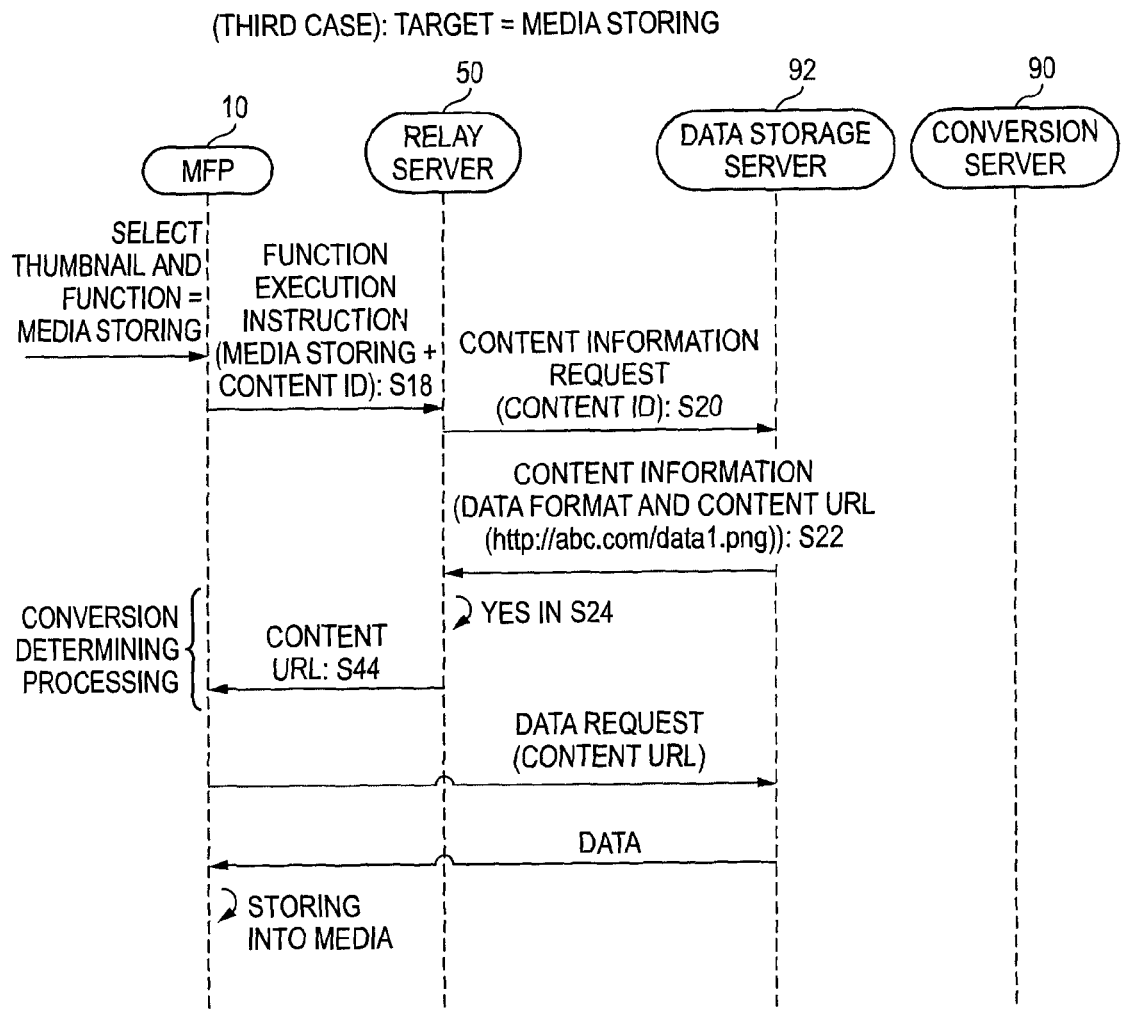
FIG. 8 shows a sequence diagram of a third case where a target function is a media storing.

(Third Case: FIG. 8)

A third case starts from a state where one or more thumbnail images are displayed on the display unit 14 of the MFP 10 (e.g., the third case continues from the first or second case).

The user of the MFP 10 can select one thumbnail image from one or more thumbnail images displayed on the display unit 14 by operating the operation unit 12. Further, the user of the MFP 10 can select a function that the MFP 10 is to execute by operating the operation unit 12. In the third case, the target function is the media storing function. Incidentally, the user sets a storing medium in the media storage unit 20 of the MFP 10.

The MFP 10 transmits a function execution instruction, which includes a content ID associated with the thumbnail data of the thumbnail image selected by the user and function information indicating the media storing function, to the relay server 50.

When the function execution instruction is received (YES in S18 of FIG. 5), the relay server 50 transmits a content information request, which includes the content ID (e.g., target content ID) included in the function execution instruction, to the data storage server 92 (S20 in FIG. 5).

When the content information request is received, the data storage server 92 specifies a data format of the data file associated with the target content ID. Then, the data storage server 92 transmits the content information, which includes the specified data format and the content URL associated with the target content ID, to the relay server 50.

When the content information is received (S22 in FIG. 5), the relay server 50 determines YES in S24 of FIG. 5. Then, the relay server 50 transmits the content URL included in the content information to the MFP 10 (S44 in FIG. 5).

When the content URL is received, the MFP 10 designates the content URL as a transmission destination and transmits a data request to the data storage server 92. The data storage server 92 transmits the data file, which is associated with the content URL included in the data request, to the MFP 10. When the data file is received, the MFP 10 stores the data file in the storing medium set in the media storage unit 20.

In the third case, the MFP 10 executes the media storing function to thus store the data file, which is received from the data storage server 92, into the storing medium. In the media storing function, it is not necessary for the MFP 10 to interpret the data that is included in the data file received from the data storage server 92. Therefore, the MFP 10 is able to execute the media storing function, irrespective of the data format of the data included in the data file. Hence, when the function to be executed by the MFP 10 is the media storing function, the relay server 50 can determine that the MFP 10 is able to execute the media storing function, without referring to the data format of the data (e.g., data file associated with the target content ID) becoming the execution target of the function.

Further, the MFP 10 is able to acquire the data file from the data storage server 92 by using the content URL. Therefore, the MFP 10 is able to execute the media storing function by using the data file.

Figure 9:
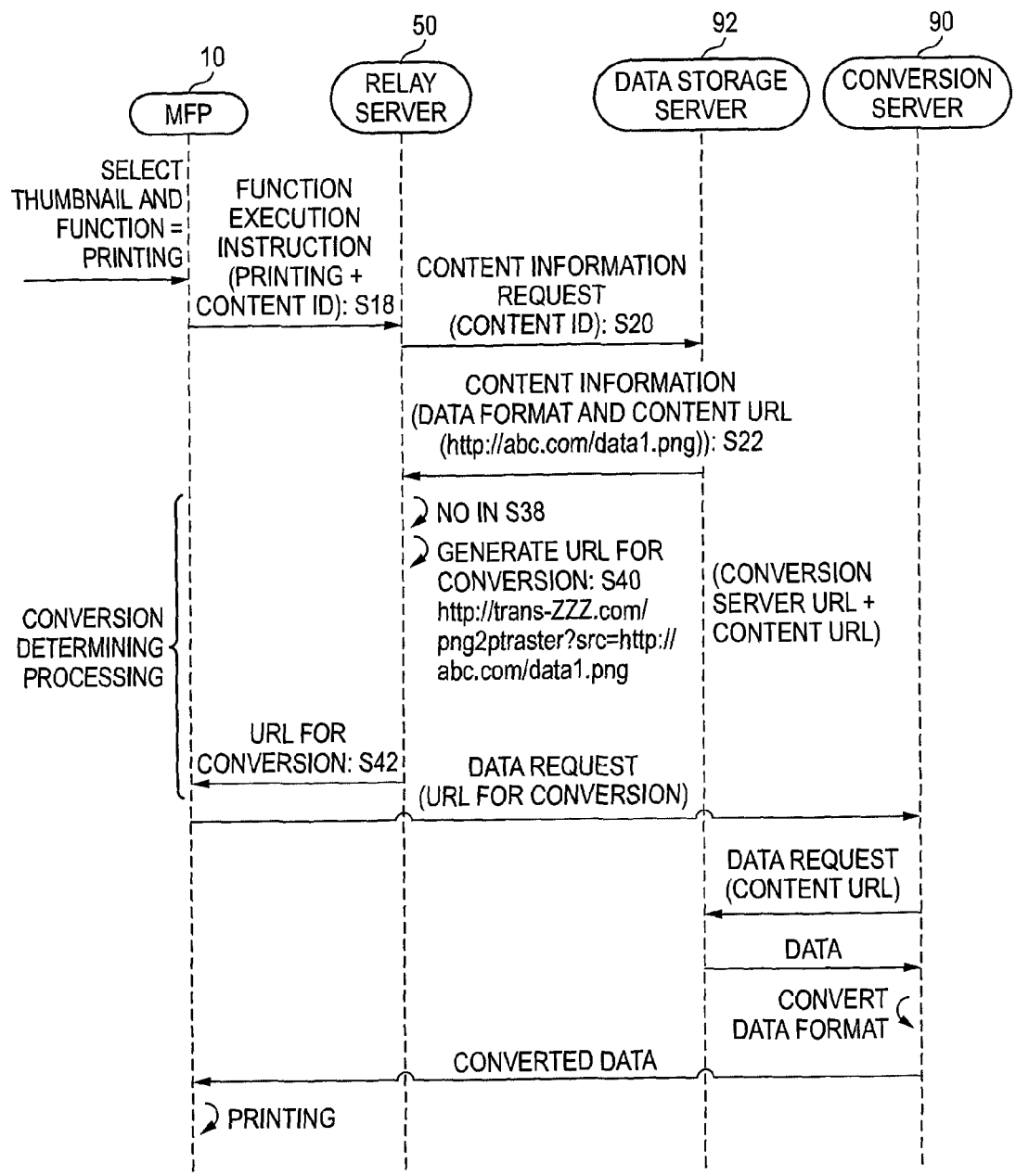
FIG. 9 shows a sequence diagram of a fourth case where a target function is a printing and data conversion is required.

(Fourth Case: FIG. 9)

A fourth case starts from a state where one or more thumbnail images are displayed on the display unit 14 of the MFP 10 (e.g., the fourth case continues from the first or second case). Like the third case, the MFP 10 transmits a function execution instruction to the relay server 50. In the fourth case, the target function is the printing function.

In the fourth case, the processing is the same as that of the third case until the relay server 50 receives the content information from the data storage server 92 (S22 of FIG. 5).

The relay server 50 determines NO in S24, S26, S30 and S34 by using the function information received from the MFP 10. Therefore, the relay server 50 determines whether the data format included in the content information is a data format with which the MFP 10 is able to execute the printing function, by using the model correspondence table 74 (S38 in FIG. 5). When a result of the determination in S38 is NO, the relay server 50 generates a URL for conversion by using the content URL included in the content information and the URL information table 76 (S40 in FIG. 5). Then, the relay server 50 transmits the generated URL for conversion to the MFP 10 (S42 in FIG. 5).

When the URL for conversion is received, the MFP 10 designates the received URL for conversion as a transmission destination and transmits a data request. The data request is transmitted to the conversion server 90. Like the first case, the conversion server 90 interprets the character string, which is described at the position after 'src=' in the URL for conversion, as the content URL. The conversion server 90 designates the content URL as a transmission destination and transmits the data request to the data storage server 92. When the data file is received from the data storage server 92, the conversion server 90 converts the data format, based on the character string described at the predetermined position in the URL for conversion. Then, the conversion server 90 transmits the converted data file to the MFP 10. When the data file is received, the MFP 10 enables the print execution unit 16 to print an image, which is expressed by the data included in the data file.

According to the above configuration, the MFP 10 enables the conversion server 90 to execute the conversion processing of converting the data format of the data file by using the URL for conversion. As a result, the MFP 10 is able to acquire the data file including the converted data file. Therefore, the MFP 10 is able to execute the printing function by using the converted data.

As can be clearly seen from the above, the relay server 50 determines whether the MFP 10 is able to execute the target function by using the data stored in the data storage server 92, based on the function selected by the user of the MFP 10 (S24, S26 and the like in FIG. 5). The relay server 50 executes the different processing (S40, S42 and S44 of FIG. 5) so that the MFP 10 executes the target function, depending on the determination result. As a result, the MFP 10 capable of executing a plurality of functions can appropriately execute the target function.

When a type of the target function is a function other than the media storing function (e.g., the color FAX transmission, the monochrome FAX transmission, the thumbnail display, the display and the printing), the relay server 50 determines whether the MFP 10 is able to execute the target function by using the data format of the data file stored in the data storage server 92. According to this configuration, the relay server 50 can appropriately determine whether the MFP 10 is able to execute the target function. Further, the relay server 50 can appropriately determine whether the data format stored in the data storage server 92 is a data format with which the MFP is able to execute the target function, by using the model correspondence table 74. Incidentally, when a type of the target function is any one of the color FAX transmission and the monochrome FAX transmission and the relay server 50 determines that the MFP 10 is unable to execute the target function (NO in S28, S32 and S36 of FIG. 5), the same processing as the fourth case is executed in the respective devices 10, 50, 90, 92.

Incidentally, the relay server 50 is an example of the 'control device' and the MFP 10 is an example of the 'function execution apparatus.' The media storing function, the color FAX transmission function, the monochrome FAX transmission function, the display function and the printing function are an example of the 'plurality of functions', the media storing function is an example of the 'first function' and each of the color FAX transmission function, the monochrome FAX transmission function, the display function and the printing function is an example of the 'second function.' The data file and thumbnail data stored in the data storage server 92 are the 'first data.' The data converted by the conversion processing of the conversion server 90 is the 'second data.' The memory 70 is an example of the 'first storage unit' and the 'second storage unit.' Each of the processing in S16 of FIG. 4 and the processing in S44 of FIG. 5 is an example of the 'first processing' and each of the processing in S10 to S16 of FIG. 4 and the processing in S40 and S42 of FIG. 5 is an example of the 'second processing.' Each of the thumbnail URL 'http://abc.comidata1thumb.png' and the content URL 'http://abc.comidata1.png' is an example of the 'first location information' and the URL 'http://trans-ZZZ.com' allotted to the conversion server 90 is an example of the 'second location information.' The 'format information' is an example of the 'format information relating to a data format with which the function execution apparatus is able to execute a function.'

<Modifications to Exemplary Embodiments>

Although the exemplary embodiments of the invention have been specifically described, they are just exemplary and do not limit the scope of the claims. The technology defined in the claims includes a variety of modifications and changes to the above exemplary embodiments. For example, following modified exemplary embodiments may be included.

(First Modified Exemplary Embodiment)

The relay server 50 includes the memory 70. However, the relay server 50 may have an HDD (Hard Disk Drive) together with or instead of the memory 70. In this case, the HDD may store at least one of the respective tables 74, 76. In this modified exemplary embodiment, the HDD is an example of at least one of the 'first storage unit' and the 'second storage unit.'

(Second Modified Exemplary Embodiment)

In the above-described exemplary embodiments, the communication system 2 includes the MFP 10 and the relay server 50. However, the relay server 50 may not be provided. In this case, the control unit 30 of the MFP 10 may have the respective tables 74, 76.

Further, the control unit 30 may have the determination unit 80 and the processing execution unit 82. In this modified exemplary embodiment, the control unit 30 may execute following processing, instead of the processing of FIGS. 4 and 5. When the user selects the display function for displaying a thumbnail image, the thumbnail information list request may be transmitted to the data storage server 92 without transmitting the thumbnail request (S4 in FIG. 4). Then, the processing of S6 to S14 of FIG. 4 may be executed. That is, the determination unit 80 of the control unit 30 may execute the processing of S8. Further, the processing execution unit 82 of the control unit 30 may execute the processing of S10 to S14. When a result of the determination in S14 of FIG. 4 is YES, the processing execution unit 82 of the control unit 30 may designate the thumbnail URL or URL for conversion as a transmission destination and transmit the thumbnail request to the data storage server 92 or conversion server 90, instead of the processing of S16. Then, the processing execution unit 82 may receive the data for executing the display function of the thumbnail image from the data storage server 92 or conversion server 90.

When the user selects a thumbnail image and a target function, the control unit 30 may transmit the content information request relating to the user selection to the data storage server 92 without transmitting the function execution instruction (e.g., without executing the processing of S18 in FIG. 5) (S20 in FIG. 5). Then, the control unit 30 may execute the processing of S22 to S40 of FIG. 5. That is, the determination unit 80 may execute the processing of S24 to S38. The processing execution unit 82 may execute the processing of S40. Further, the processing execution unit 82 may designate the URL for conversion as a transmission destination and transmit the data request, instead of the processing of S42. Further, the processing execution unit 82 may designate the content URL as a transmission destination and transmit the data request, instead of the processing of S44. In this case, the processing execution unit 82 may receive the data from the conversion server 90 or data storage server 92.

In this modified exemplary embodiment, each of the processing of designating the thumbnail URL as a transmission destination, transmitting the thumbnail request to the data storage server 92 and receiving the thumbnail data from the data storage server 92 and the processing of designating the content URL as a transmission destination, transmitting the data request and receiving the data from the data storage server 92 is an example of the 'first processing.' Further, a combination of the processing of S10 to S14 and the processing of designating the URL for conversion as a transmission destination, transmitting the thumbnail request and receiving the converted data from the conversion server 90 is an example of the 'second processing.' Further, the processing of S40 and the processing of designating the URL for conversion as a transmission destination, transmitting the data request and receiving the converted data from the conversion server 90 are examples of the 'second processing.'

(Third Modified Exemplary Embodiment)

In the above-described exemplary embodiments, the communication system 2 includes the relay server 50 and the conversion server 90. However, the conversion server 90 may not be provided. In this case, the relay server 50 may execute the format conversion. In this modified exemplary embodiment, the processing execution unit 82 may generate the URL for conversion by using the URL allotted to the relay server 50 in S10 of FIGS. 4 and S40 of FIG. 5. In this modified exemplary embodiment, the URL allotted to the relay server 50 is an example of the 'second location information.'

Incidentally, in this modified exemplary embodiment, the processing execution unit 82 may acquire the thumbnail data associated with the thumbnail URL or data file associated with the content URL from the data storage server 92, instead of generating the URL for conversion. Then, the processing execution unit 82 may execute the format conversion for the acquired thumbnail data or data file and generate the converted data. Further, the processing execution unit 82 may transmit the generated and converted data to the MFP 10. In this modified exemplary embodiment, the acquisition of the thumbnail data or data file, the format conversion and the transmission of the converted data are examples of the 'second processing.'

(Fourth Modified Exemplary Embodiment)

In the above-described exemplary embodiments, when it is determined that the MFP 10 is able to execute the target function by using the data stored in the data storage server 92, the relay server 50 transmits the thumbnail URL or content URL to the MFP 10. However, the processing execution unit 82 of the relay server 50 may acquire the data from the data storage server 92 by using the thumbnail URL or content URL and transmit the data to the MFP 10. Further, when generating the URL for conversion (S10 of FIGS. 4 and S40 of FIG. 5), the processing execution unit 82 may enable the conversion server 90 to execute the format conversion by using the generated URL for conversion and acquire and transmit the converted data from the conversion server 90 to the MFP 10. In this modified exemplary embodiment, the acquisition and transmission of the data from the data storage server 92 is an example of the 'first processing' and the generation of the URL for conversion, the acquisition of the converted data and the transmission of the converted data are examples of the 'second processing.'

Alternatively, when the MFP 10 has already acquired the data from the data storage server 92, the processing execution unit 82 of the relay server 50 may transmit the function execution instruction for enabling the MFP 10 to execute the target function by using the corresponding data to the MFP 10. In this modified exemplary embodiment, the 'transmission of the function execution instruction' is an example of the 'first processing.'

(Fifth Modified Exemplary Embodiment)

In the above-described exemplary embodiments, the CPU 62 of the relay server 50 executes the processing in response to the program, so that the functions of the respective units 80 to 84 are implemented. Instead of this, at least a part of the functions of the respective units 80 to 84 may be implemented by hardware such as logical circuit.

(Sixth Modified Exemplary Embodiment)

In the above-described exemplary embodiments, the model information of the communication device and the plurality of format information corresponding to the plurality of functions that the communication device is able to execute are stored in association with each other in the function correspondence table 74. Each format information indicates a data format with which the communication device is able to execute the corresponding function. However, each format information may indicate a data format with which the communication device is unable to execute the corresponding function. In this modified exemplary embodiment, the 'format information' is an example of the 'format information relating to the data format with which the function execution apparatus is able to execute a function.'

The technical elements illustrated in the specification or drawings exhibit the technical availability individually or by a variety of combinations thereof and are not limited to the combinations defined in the claims at the time of filing the application. Further, the technology exemplified in the specification or drawings achieves a plurality of purposes at the same time and the achievement of any one purpose has the technical availability.

What is claimed is:

1. A control device for a function execution apparatus configured to execute a plurality of functions, the control device comprising:
   a processor; and
   memory storing instructions that, when executed by the processor, causing the control device to operate as:
   a determination unit configured to, when a target function is selected from the plurality of functions, determine whether the function execution apparatus is able to execute the target function by using first data, based on the target function; and
   a processing execution unit configured to:
      when it is determined that the function execution apparatus is able to execute the target function by using the first data, execute first processing for supplying the first data to the function execution apparatus for enabling the function execution apparatus to execute the target function by using the first data; and
      when it is determined that the function execution apparatus is unable to execute the target function by using the first data, execute second processing, which is different from the first processing, for supplying second data to the function execution apparatus for enabling the function execution apparatus to execute the target function by using the second data that is converted from the first data.

2. The control device according to claim 1,
   wherein when the target function is a first function, the determination unit is configured to determine that the function execution apparatus is able to execute the target function by using the first data, irrespective of a data format of the first data, and
   wherein when the target function is a second function that is different from the first function, the determination unit is configured to determines whether the function execution apparatus is able to execute the target function by using the first data based on the data format of the first data in combination with the target function.

3. The control device according to claim 2,
   wherein the instructions that, when executed by the processor, causes the control device to operate as:
   a first storage unit configured to store format information relating to a data format with which the function execution apparatus is able to execute a function, for each of the plurality of functions,
   wherein when the target function is the second function, the determination unit is configured to compare a data format, which is indicated by the format information of the second function in the first storage unit, and the data format of the first data so as to determine whether the function execution apparatus is able to execute the target function by using the first data.

4. The control device according to claim 2,
   wherein the first function is a function that the function execution apparatus stores the first data in a storage medium set in the function execution apparatus.

5. The control device according to claim 1,
wherein the control device is configured to communicate with a data storage server, which stores the first data, through a network, and
wherein the first processing comprises transmitting first location information, which indicates a location of the first data in the data storage server, to the function execution apparatus for enabling the function execution apparatus to acquire the first data from the data storage server.

6. The control device according to claim 1,
wherein the control device is independently configured from the function execution apparatus,
wherein the control device is configured to communicate with a data storage server, which stores the first data, through a network,
wherein the control device further comprises:
- a reception unit configured to receive first location information, which indicates a location of the first data in the data storage server, from the data storage server; and
- a second storage unit configured to store second location information, which indicates a location of a conversion device, the conversion device being configured to execute conversion processing of converting the first data to generate the second data, and wherein the second processing comprises transmitting the first location information and the second location information to the function execution apparatus such that the function execution apparatus enables the conversion device to execute the conversion processing.

7. The control device according to claim 6,
wherein the processing execution unit is configured to generate a third location information by combining the first location information and the second location information and to execute the second processing comprising transmitting the third location information to the function execution apparatus.

8. A non-transitory computer-readable storage medium having a computer program stored thereon and readable by a computer of a control device for a function execution apparatus configured to execute a plurality of functions, the computer program, when executed by the computer, causes the control device to perform operations comprising:
- determination processing of, when a target function is selected from the plurality of functions, determining whether the function execution apparatus is able to execute the target function by using first data, based on the target function;
- first processing of, when it is determined that the function execution apparatus is able to execute the target function by using the first data, supplying the first data to the function execution apparatus for enabling the function execution apparatus to execute the target function by using the first data; and
- second processing of, when it is determined that the function execution apparatus is unable to execute the target function by using the first data, supplying second data to the function execution apparatus for enabling the function execution apparatus to execute the target function by using the second data that is converted from the first data, the second processing being different from the first processing.

\* \* \* \* \*